United States Patent
Traut et al.

(10) Patent No.: US 10,621,096 B2
(45) Date of Patent: Apr. 14, 2020

(54) READ AHEAD MANAGEMENT IN A MULTI-STREAM WORKLOAD

(71) Applicant: Seagate Technology LLC, Cupertino, CA (US)

(72) Inventors: Zachary D. Traut, Denver, CO (US); Michael D. Barrell, Superior, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 87 days.

(21) Appl. No.: 15/259,998

(22) Filed: Sep. 8, 2016

(65) Prior Publication Data
US 2018/0067860 A1 Mar. 8, 2018

(51) Int. Cl.
*G06F 12/0862* (2016.01)
*G06F 12/0868* (2016.01)

(52) U.S. Cl.
CPC ...... *G06F 12/0862* (2013.01); *G06F 12/0868* (2013.01); *G06F 2212/1021* (2013.01); *G06F 2212/1024* (2013.01); *G06F 2212/264* (2013.01); *G06F 2212/602* (2013.01); *G06F 2212/608* (2013.01)

(58) Field of Classification Search
CPC ......... G06F 12/0862; G06F 2212/1021; G06F 2212/602; G06F 2212/608
See application file for complete search history.

(56) References Cited

U.S. PATENT DOCUMENTS

| | | | |
|---|---|---|---|
| 8,732,406 B1* | 5/2014 | Pase | G06F 12/0862 711/137 |
| 9,304,900 B2* | 4/2016 | Liu | G06F 12/0862 |
| 2001/0022094 A1 | 9/2001 | Makikawa et al. | |
| 2010/0211731 A1* | 8/2010 | Mittendorff | G06F 12/0866 711/113 |
| 2013/0318283 A1 | 11/2013 | Small et al. | |
| 2014/0250268 A1* | 9/2014 | Traut | G06F 12/0862 711/113 |
| 2014/0258638 A1 | 9/2014 | Traut et al. | |
| 2014/0351527 A1 | 11/2014 | Traut et al. | |
| 2015/0169449 A1 | 6/2015 | Barrell et al. | |
| 2017/0017413 A1* | 1/2017 | Aston | G06F 3/0643 |

* cited by examiner

*Primary Examiner* — Eric Cardwell
(74) *Attorney, Agent, or Firm* — Holzer Patel Drennan

(57) ABSTRACT

Implementations described and claimed herein provide a method and system for managing execution of commands for a storage device, the method comprising identifying individual streams processing read ahead operations in a storage controller, determining an amount of read ahead data that each individual stream is processing in the read ahead operations, determining a total amount of read cache available for the storage controller, and determining a total amount of read ahead data that all the individual streams are processing in the read ahead operations.

18 Claims, 5 Drawing Sheets

READ AHEAD MANAGEMENT IN A MULTI-STREAM WORKLOAD

BACKGROUND

Storage controllers receive data read and write requests from host computers. The storage controllers control one or more physical storage devices to store or provide requested data from or to the host computers. The storage controllers can buffer read and write data requests, converting the host data read and write requests into redundant array of independent drives/disks ("RAID") commands or storage device read or write requests. Storage controllers can store read and write data in cache memories.

In some embodiments, cache memories have smaller capacity, but faster read and write times compared to other data storage devices. Therefore, cache memories should operate efficiently for overall storage controller performance to be maximized to all interconnected host computers.

SUMMARY

Implementations described and claimed herein provide a method and system for managing execution of commands for a storage device, the method comprising identifying individual streams processing read ahead operations in a storage controller, determining an amount of read ahead data that each individual stream is processing in the read ahead operations, determining a total amount of read cache available for the storage controller, and determining a total amount of read ahead data that all the individual streams are processing in the read ahead operations.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Descriptions of various implementations as further illustrated in the accompanying drawings and defined in the appended claims. These and various other features and advantages will be apparent from a reading of the following detailed descriptions. Other implementations are also described and recited herein.

BRIEF DESCRIPTIONS OF THE DRAWINGS

DETAILED DESCRIPTIONS

Figure 1:
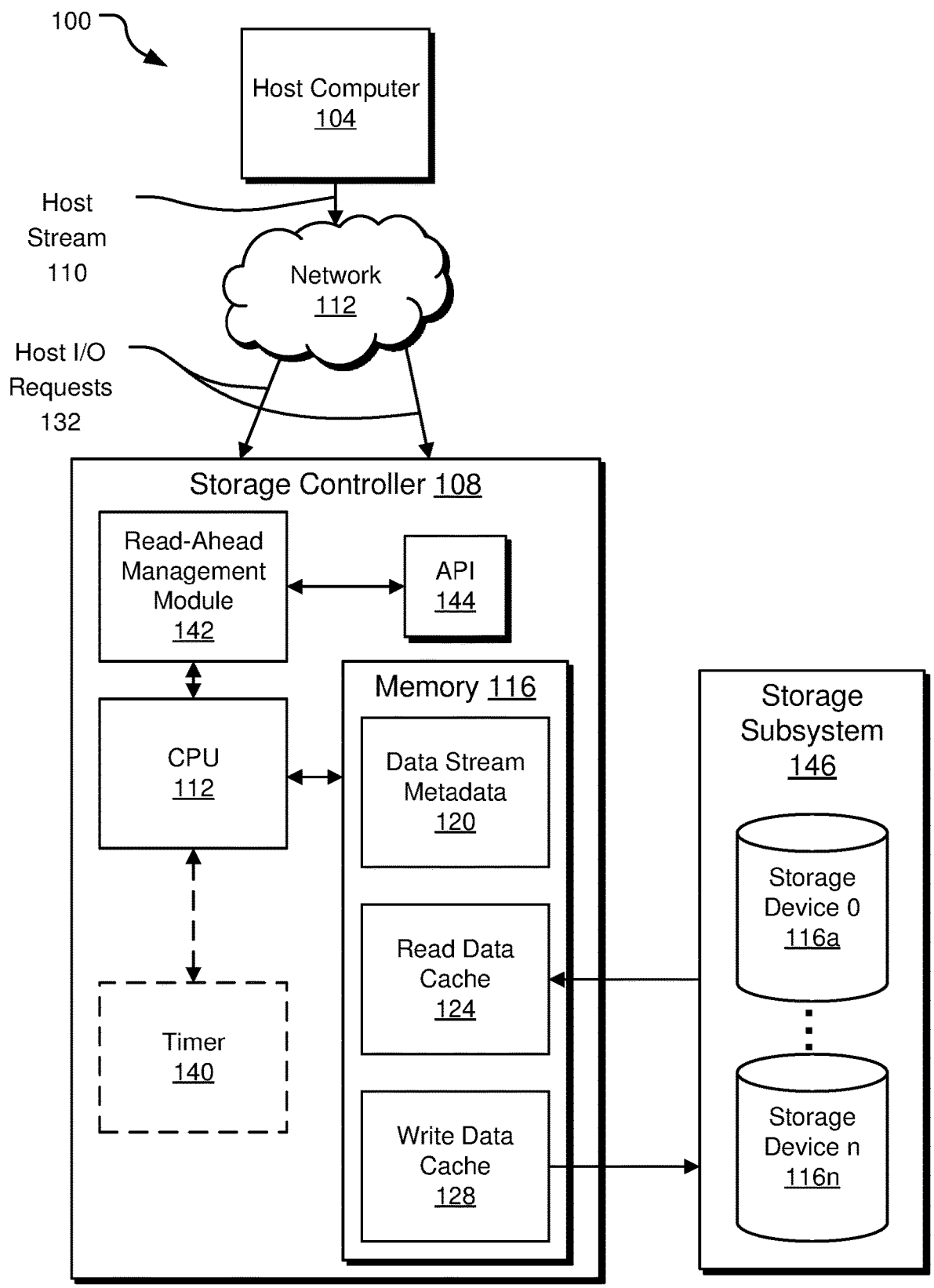
FIG. 1 illustrates a block diagram of an example data storage device system.

Host computers interact with data storage systems by providing either random or sequential I/O requests. In the case of sequential I/O requests, storage controllers of the data storage systems handle as many different sequential host I/O streams as possible in order to maximize performance. Host sequential I/O streams include a series of generally consecutive I/O requests directed to the same storage device, logical volume, or virtual disk.

Each host computer issues read and write data requests based on the applications and other programs executed by that host computer. In most cases, the applications and other programs currently being executed by one host computer is different than the applications and other programs being executed by a different host computer. Each host computer therefore issues a different set of sequential read or write requests, which are known as a host stream. Storage controllers attempt to maintain a static amount of read ahead data in the read cache for each host stream. A given host computer can issue multiple host streams.

Many storage controllers have separate areas of memory dedicated to read cache and write cache. If requested data is in the read cache when a host computer requests the data, it may be referred to as a "cache hit." If requested data is not in the read cache when a host computer requests the data that is a "cache miss." It is advantageous for a cache memory to store data before a host computer requests the data. In this way, the requested data can be provided at faster cache memory speeds instead of slower storage device speeds. In order for a read cache to contain data before a host computer requests the data, it is necessary for the storage controller to predict in advance which data is likely to be requested, and perform a read ahead operation to read the data from storage devices and store the data in the read cache. Read ahead operations are desirable since they improve the ratio of cache hits to cache misses.

Read ahead streams are established for host read streams that the storage controller firmware has determined to be sequential enough to require a read ahead operation. Read ahead streams maintain separation from the host read stream where the separation is data that is available in the read cache. As the host read stream encroaches on that separation, the read ahead stream will "fire" or read more data into the read cache to increase its separation from the host read stream. Thus, one stream is processed at a time, and dependent on the host read stream encroaching on desired separation.

While a static read ahead size is generally efficient for host computers that provide a relatively constant stream of read requests, this is often not the case for host computers that issue bursts of read requests to storage controllers. A burst is a consecutive group of sequential host read requests from the same host computer. A burst of host read requests, or "bursty IO pattern," creates a high initial queue depth (QD). A QD refers to the number of I/O requests that can be queued at one time on a storage controller. If the burst of host read requests adds up to more than the static read ahead size of the read cache, the host stream will eventually catch up with a read ahead operation and cache misses will occur with every burst, thus lowering read performance.

The disclosed technology includes a method of monitoring total read ahead allocation for a single controller. Specifically, a read ahead module maintains a hash table of streams that are requesting read ahead operations (referred to hereinafter as a "read ahead stream") and how much read ahead each stream is requesting. The read ahead module maintains the total amount of read cache available for a controller and the total amount of read ahead data that all streams are requesting. In one implementation, whenever a read ahead stream triggers a read ahead operation, the read ahead stream processing will communicate with the read ahead module with the following: a read ahead stream's container number, stream ID, and the amount of read ahead data requested. The read ahead module will check to see if the read ahead stream is in the hash table.

If the read ahead stream is in the hash table, the read ahead module will decrement the read ahead stream's previous value for read ahead from the total read ahead of all streams, and remove the read ahead stream from the hash table. Depending on how much read cache is available, the read ahead stream may be allowed its requested read ahead space or given a smaller amount of read ahead space. Subsequently, the read ahead stream may communicate again with the read ahead module and communicate how much of the read ahead space it is taking.

FIG. 1 is a block diagram illustrating a data storage device system 100. The data storage device system 100 includes one or more host, computer (e.g., a host computer 104) interconnected to a storage controller 108 through a bus or network 112. The host computer 104 generates a host stream 110, which is multiple groups of host I/O requests 132.

A storage controller 108 includes a CPU or processor 112, which executes program instructions stored in a memory 116 coupled to the CPU 112. The CPU 112 includes any processing device suitable for executing storage controller 108 programs, such as Intel x86-compatible processors, embedded processors, mobile processors, and/or RISC processors. The CPU 112 may include several devices including field-programmable gate arrays (FPGAs), memory controllers, North Bridge devices, and/or South Bridge devices.

A memory 116 may be one or more forms of volatile memory 116, non-volatile memory 116, or a combination of both volatile and non-volatile memories 116. The memory 116 includes firmware which includes program instructions that CPU 112 fetches and executes, including program instructions for the processes of the present invention. Examples of non-volatile memory 116 include, but are not limited to, flash memory, SD, EPROM, EEPROM, hard disks, and NOVRAM. A volatile memory 116 stores various data structures and user data. Examples of the volatile memory 116 include, but are not limited to, SRAM, DDR RAM, DDR2. RAM, DDR3 RAM, Z-RAM, TTRAM, A-RAM, ETA RAM, and other forms of temporary memory.

The memory 116 includes a read data cache 124, and in some implementations a data cache 128, which provide improved read and write performance, respectively, to the host computer 104. The memory 116 also includes data stream metadata 120. Data stream metadata 120 stores parameters related to host I/O requests 132 and are used to control sequential I/O operations.

The storage controller 108 is coupled to storage subsystem 146, which includes one or more storage devices 116a-116n (e.g., a hard disk drive, optical drive, tape drive, solid state device, or any other form of mass data storage device). Frequently accessed data is read from storage devices 116 into the read data cache 124, where it can be provided in response to host I/O requests 132 much faster than directly from the storage devices 116. Write data is initially stored in the write data cache 128, which is much faster than writes sent directly to storage devices 116.

The storage controller 108 includes a timer 140. In some implementations, there may be more than one timer 140. The timer 140 may be a hardware timer controlled by the CPU 112, or it may be software routines that execute on CPU 112. The timer 140 measures the time between bursts. The timer 140 may represent any number of timers. As will be described below, there is one timer 140 allocated to each active stream corresponding to each logical volume, VDisk, or storage device 116.

The storage controller 108 also includes a read ahead management module 142. As provided above, the read ahead management module 142 can manage which read ahead streams are requesting a read ahead and what size of read ahead is requested by each read ahead stream. The read ahead management module 142 may also maintain a running total of the total requested read ahead by all read ahead streams and the amount of cache used. In one implementation, the read ahead management module 112 may also tabulate inputs from the read ahead streams in a hash table. Such inputs may include at least one of a container number of the read ahead stream, a stream ID of the read ahead stream, and an amount of read ahead data requested by the read ahead stream.

In alternative implementation, a data structure that is used to implement an associative array may be used instead of the hash table to tabulate the inputs. Such data structure may tabulate the amount of read ahead for the read ahead stream, a global amount of read ahead for all read ahead streams that has been requested, and the size of total read ahead cache available. Thus for example, each entry into the hash table may include an identifier for a given read ahead stream, the amount of read ahead data requested by the given read ahead stream, a global amount of read ahead for all read ahead streams that has been requested, and the size of total read ahead cache available.

In some implementations, there may be application program interfaces (e.g., API 144) for the read ahead management module 142 located in the storage controller firmware. In one implementation, the API 144 may generate an initial reservation request for a read-ahead stream. The API 144 can return an amount of read ahead data in blocks that the read ahead stream has the option to use, as agreed upon by the read ahead management module 142 and stream.

In another implementation, the API 144 may generate a subsequent request for a read ahead stream to claim how much data to process. For example, if the read ahead management module 142 allows one and a half stripe (or other segment of logical sequential data) of data and the read ahead stream wants two stripes of data, the read ahead stream will process one stripe of data. Alternatively, the read ahead stream can process half a stripe or none. The return value is the amount of read-ahead data that is allowed by the read ahead management module and may be required to match the value of the read ahead size or space. The subsequent request to claim an amount of read ahead data pushes the read ahead stream back on the hash table and decrements the total amount of read ahead data available.

Figure 2A:
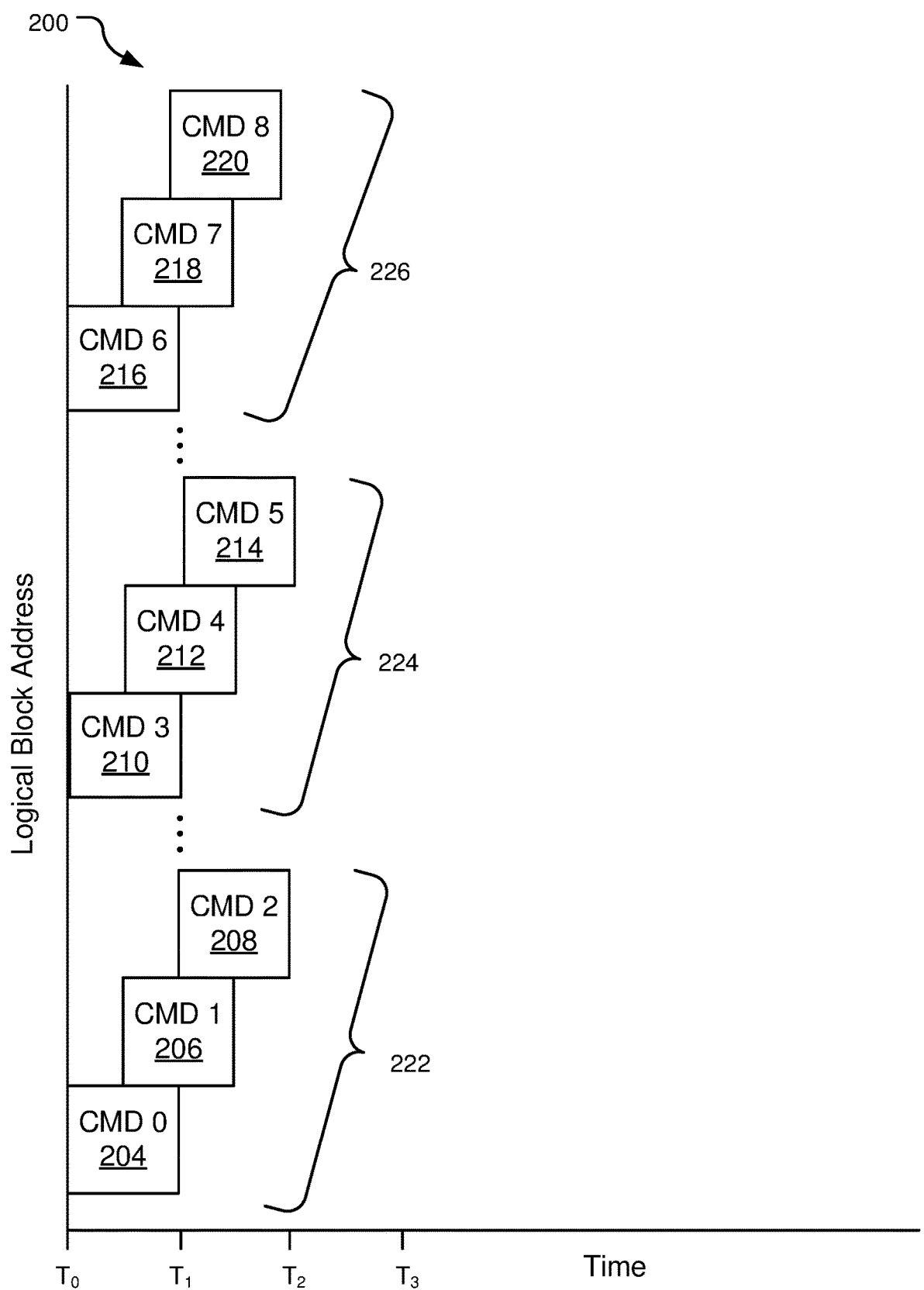
FIGS. 2A and 2B illustrates graphs of storage device command sequences in an example storage device system.
Figure 2B:
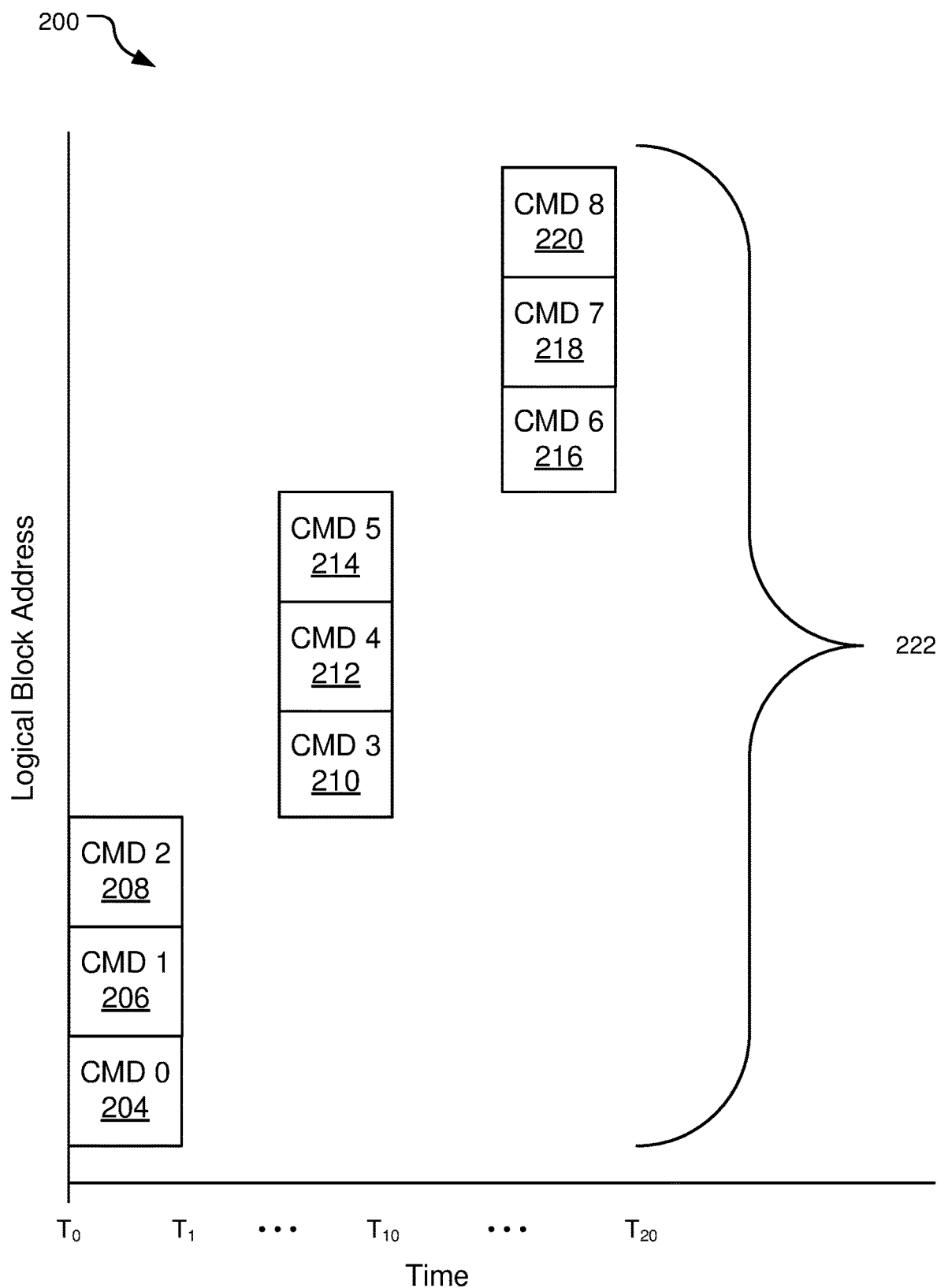

FIGS. 2A and 2B illustrate a graph 200 of storage device command sequences. Specifically, the graphs show measurements of logical block address (LBA) vs. time. A storage controller receives host read requests and converts the host read requests into storage device read commands. As shown in FIG. 2A, there are three concurrent host read streams 222, 224, and 226. Each of the host read streams 222, 224, and 226 includes three storage device commands (e.g., host read stream 222 includes cmd 0 204, cmd 1 206, cmd 2 208, host read stream 224 includes cmd 3 210, cmd 4 212, cmd 5 214, and host read stream 226 includes cmd 6 216, cmd 7 218, and cmd 8 220) directed to a storage device. The commands are received at specific times. For example, cmd 0 204 is received at $T_0$, cmd 1 206 is received at $T_{1/2}$, and cmd 2 208 is received at $T_1$. Each storage device read command includes a read command length (e.g., in bytes of data), and a read command address, which is the LBA.

The three commands in each of the host read streams 222, 224, and 226 are in a sequentially ascending order with a starting LBA of a subsequent command close to the ending LBA of a predecessor command, representative of a constant QD. The QD refers to the number of I/O requests that can be queued at one time on a storage controller. The QD is represented in the graph 200 as at any time there is a constant number of commands being processed. In FIG. 2A, the QD is 2.

Once a trend of sequentially ascending order of the commands is realized, a read ahead operation can be performed to the back end disk. A read ahead operation can read ahead of each host read stream of commands advancing the requests and providing cache hits. As the read ahead operation requests are increased, the cache hits also increase, shortening the time that it takes for reads necessary to perform the sequence of commands.

FIG. 2B shows an example host computer that issues bursts of read requests to storage controllers. A consecutive group of sequential host read requests from the same host computer are shown as a burst of host read requests (or "bursty IO pattern") with a high initial QD. As shown in FIG. 2B, a series of nine sequential storage device commands (e.g., cmd 0 204, cmd 1 206, cmd 2 208, cmd 3 210, cmd 4 212, cmd 5 214, cmd 6 216, cmd 7 218, and cmd 8 220) are directed to a storage device. The nine sequential storage device commands make up one stream.

A storage controller determines a burst length by adding up the concurrent commands when a QD goes from zero to non-zero. Once the storage controller determines the burst length, the burst length can be multiplied by a read ahead multiplier to determine a read ahead data size. The read ahead multiplier may be an integer or an integer plus a fractional component. For example, the read ahead multiplier may be set to 2. If it is found that the host stream frequently catches up with the read ahead operations, the read multiplier can be incremented to 3, and then retested. The test process can be repeated until the host stream no longer catches up to the read ahead operations, or only rarely does.

The disclosed technology includes an adaptive read ahead operation where the controller initiates a read ahead operation if the most recent read requests accessed sequential sectors of the disk. A host read stream's maximum burst size over a series of bursts can be tracked (e.g., for over ten bursts). This value of maximum burst size can be doubled and rounded up to the nearest stripe to create the desired separation of a read ahead stream. The desired separation will be the amount available to read cache for the read ahead stream.

In some implementations, an adaptive read ahead operation can be performed for a single stream (e.g., stream 222) but in some cases not performed for other streams. For example, if 100 streams in a system are bursting in a way to imply that 25 MB space per stream is required, it may be presumed that 2500 MB (100 streams*25 MB) is required in a read cache. A host may be issuing too many large and bursty read requests. In an implementation with a read cache of 2 GB (or 2048 MB), there may not be enough space in a read cache to hold all of the read ahead. In comparison, when the host is using constant QD read streams this problem does not occur.

Referring to FIG. 2B, for example, stream 222 is a single stream, which may have an associated read ahead stream requesting 25 MB. The read ahead stream acquires 25 MB worth of cache space from the least-recently used (LRU) area of cache (not shown). As the area of cache set aside for stream 222's read ahead data is filled in with read ahead data, the area of cache set aside becomes the most-recently used area of cache. Concurrent streams continue to acquire their own read ahead data in the same manner as stream 222, and push stream 222's read ahead data towards the LRU area of cache. For example, if a stream X acquires a place for its read ahead data (using the LRU operation), stream X takes up stream 222's read ahead data cache area. If a host has not yet read the data for stream 222, the read ahead data for stream 222 is lost, resulting in cache misses for stream 222 and a large performance loss. As the loss continues to all streams, data that was read for read ahead operations and lost is then re-read, defeating the purpose of read ahead operations. As a result, there are no cache hits and no gain for the back end access.

The disclosed technology provides management of all of the streams requesting read ahead data by monitoring total read ahead allocation for a single controller, and how much read cache is available. The streams may be allowed its requested read ahead data, given an option for a smaller amount of read ahead data, or an option to take no action. Such management of all of the streams requesting read ahead data increases read performance.

Figure 3:
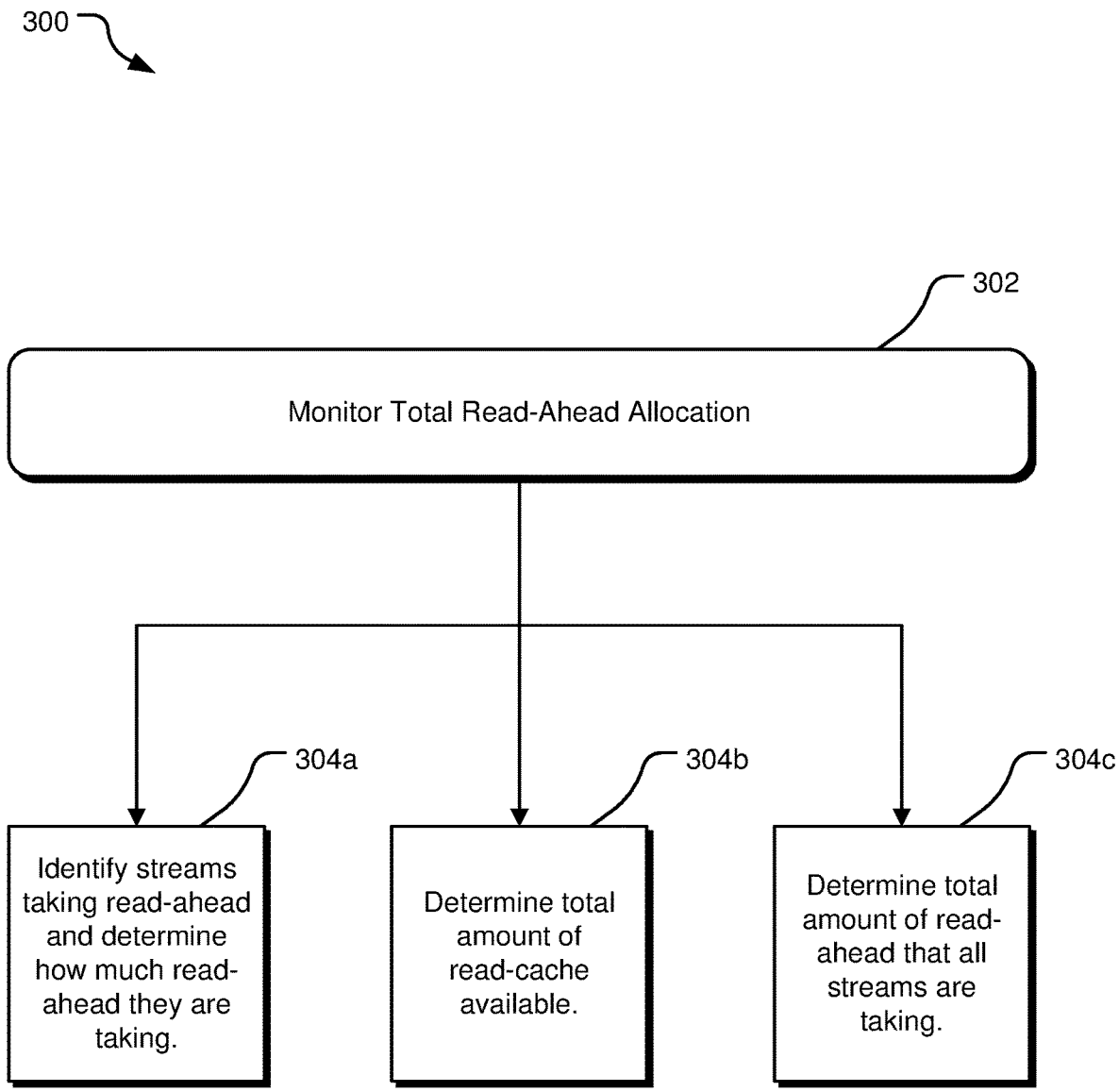
FIG. 3 illustrates a flow chart of example operations for monitoring total read ahead allocation.

FIG. 3 illustrates a flow chart of example operations 300 for monitoring total read ahead allocation. A monitoring operation 302 monitors total read ahead allocation. Specifically, a read ahead management module can manage read ahead by performing multiple monitoring steps dynamically, and systematically or sequentially. For example, in an identifying operation 304a, the read ahead management module can identify the streams requesting read ahead and determine how much read ahead the streams are requesting.

In a determining operation 304b, the read ahead management module can determine a total amount of read cache available. The total amount of read cache is a known constant to the read ahead management module set at a build time. In a determining operation 304c, the read ahead management module can determine a total amount of read ahead that all the streams have requested.

Figure 4:
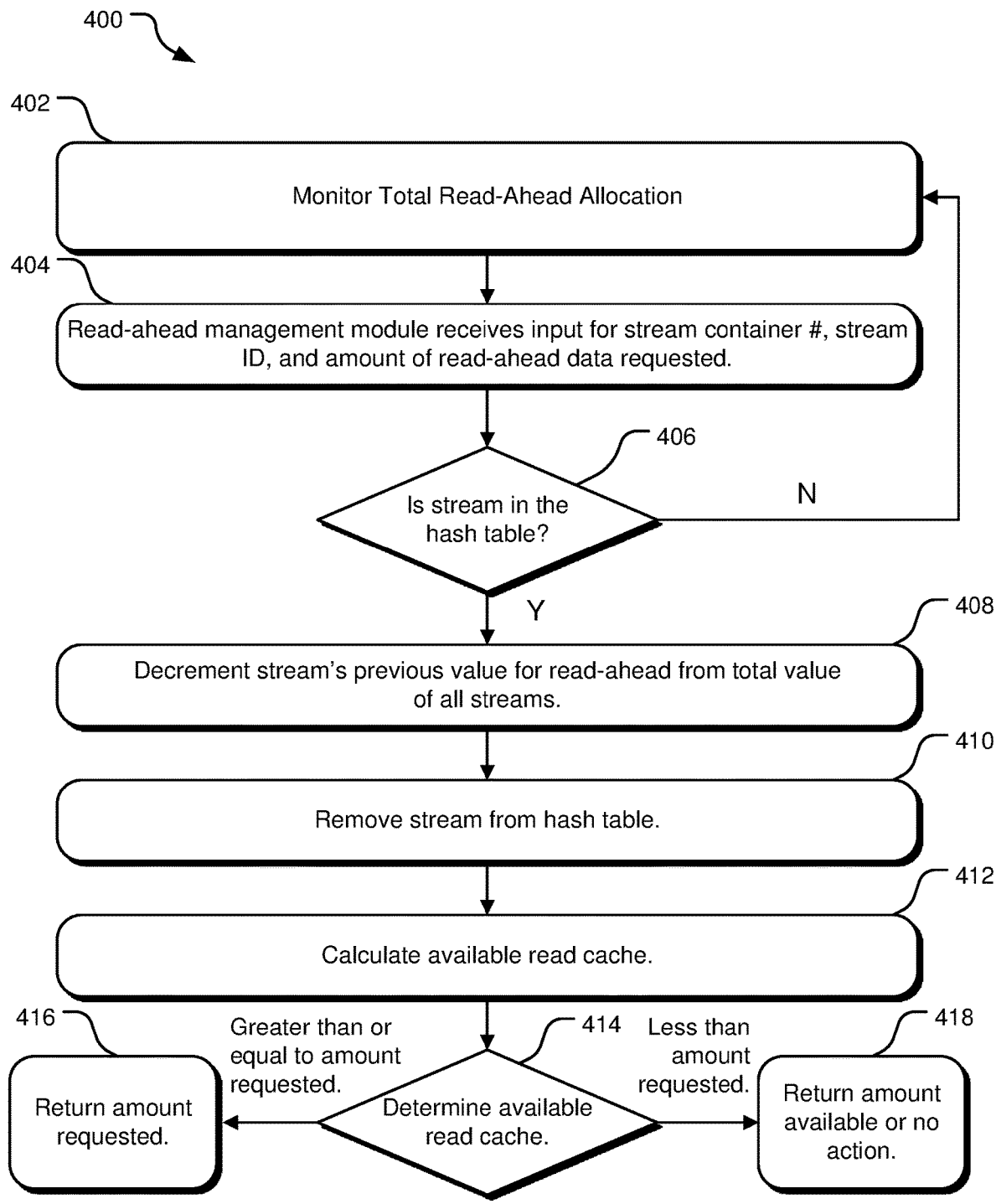
FIG. 4 illustrates a flow chart of example operations for using the monitored total read ahead allocation to determine available read cache.

FIG. 4 illustrates a flow chart of example operations 400 for using the monitored total read ahead allocation to determine available read cache. In a monitoring operation 402, a read ahead management module monitors total read ahead allocation in a system. When a read ahead is ready to issue a read ahead stream, the read ahead stream requests to perform a read ahead operation. The read ahead management module receives inputs in a receiving operation 404. The inputs can include a stream container number, stream ID, and an amount of read ahead data requested.

In a determining operation 406, the read ahead management module determines if the stream is in the hash table. If the stream is in the hash table, the read ahead management module decrements the previous value of the stream for read ahead from a total value of all streams in a decrementing operation 408. If the stream is not in the hash table, the read ahead management module monitors total read ahead allocation in a system again in operation 402 and continues operations 400. In a removing operation 410, the stream can be removed from the hash table. A calculating operation 412 calculates the available read cache available. If the read cache available is equal to or greater than the amount requested by the stream, then the amount requested is returned in a returning operation 414. If the read cache available is less than the amount requested by the stream, then the amount available is returned in a returning operation 416, or no action can be taken.

In some implementations, there is a release of unused read ahead stream(??). The streams in these cases may simply die off. A stream moving and using read ahead may issue read ahead but the host stream has ceased and therefore its read ahead is not resulting in a cache hit. A stream recycling method may be utilized when the streams go stale or when two streams merge. In these cases, the read ahead management module is informed so that the read ahead management module frees up the read ahead reserved for the stream. The read ahead module will require a stream ID and container number. A size of read ahead as "O" would accomplish the task and no subsequent call from the read ahead stream is required as no read ahead will be requested.

The embodiments described herein are implemented as logical steps in one or more computer systems. The logical operations of the embodiments described herein are implemented (1) as a sequence of processor-implemented steps executing in one or more computer systems and (2) as interconnected machine or circuit modules within one or more computer systems. The implementation is a matter of choice, dependent on the performance requirements of the computer system implementing embodiments described herein. Accordingly, the logical operations making up the embodiments described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments described herein. Since many alternate embodiments can be made without departing from the spirit and scope of the embodiments described herein, the invention resides in the claims hereinafter appended. Furthermore, structural features of the different embodiments may be combined in yet another embodiment without departing from the recited claims. The implementations described above and other implementations are within the scope of the following claims.

What is claimed is:

1. A system comprising:
    a storage controller configured to:
        convert each of a plurality of groups of sequential host read requests into a respective group of read commands, the read commands in each group of read commands being in a sequentially ascending order of logical block addresses (LBAs);
        determine, for each group of read commands, a burst length by summing read command lengths of each of the read commands in the group and a read ahead data size by applying a multiplier to the burst length of the group;
        initiate, for each group of read commands, a read ahead stream at the read ahead data size for the group;
        monitor read ahead allocation of the read ahead streams by:
            determining an amount of read ahead data that each read ahead stream is requesting in the read ahead operations;
            determining a total amount of read cache available for the storage controller; and
            determining a total amount of read ahead data that the read ahead streams are requesting in the read ahead operations; and
        store each read ahead stream processing read ahead operations and the amount of read ahead data that said each read ahead stream is processing in the read ahead operations in a hash table.

2. The system of claim 1, wherein the storage controller is further configured to receive inputs from an individual one of the read ahead streams when the individual read ahead stream requests to perform a read ahead operation.

3. The system of claim 2, wherein the inputs include at least one of a container number of a stream, a stream ID, and an amount of read ahead data requested.

4. The system of claim 2, wherein the storage controller is further configured to decrement a previous value for a read ahead stream from the total read ahead allocation of all read ahead streams.

5. The system of claim 4, wherein the storage controller is further configured to:
    adjust the multiplier for at least one of the groups of read commands based on the monitoring operation;
    determine an updated read ahead data size for the group by applying the adjusted multiplier to the burst length of the group; and
    initiate the updated read ahead data size for the read ahead stream for the group.

6. A method comprising:
    converting a consecutive group of sequential host read requests into read commands;
    identifying multiple read ahead streams, each of the multiple read ahead streams including a plurality of the read commands in a sequentially ascending order of logical block addresses (LBAs);
    identifying individual read ahead streams processing read ahead operations in a hardware storage controller;
    storing the identification of individual read ahead streams processing read ahead operations and the amount of read ahead data that each individual read ahead stream is processing in the read ahead operations in a hash table;
    determining an amount of read ahead data that each individual read ahead stream is requesting in the read ahead operations;
    determining a total amount of read cache available for the storage controller;
    determining a total amount of read ahead data that multiple read ahead streams are requesting in the read ahead operations; and
    performing a requested read ahead operation for a first read ahead stream responsive to determining the total amount of read cache available and results from monitoring the total read ahead allocation.

7. The method of claim 6, further comprising receiving inputs from an individual one of the read ahead streams when the individual read ahead stream is available to process a read ahead operation.

8. The method of claim 7, wherein the input is at least one of a container number of a stream, a stream identifier, and an amount of read ahead data requested.

9. The method of claim 6, further comprising decrementing a previous value for an individual one of the read ahead streams from the total amount of data that the read ahead streams are processing in the read ahead operations.

10. The method of claim 6, further comprising removing an individual one of the read ahead streams from a hash table.

11. The method of claim 6, further comprising performing a requested read ahead operation if the read cache available is an amount more than an amount that an individual one of the read ahead streams is requesting.

12. The method of claim 6, further comprising performing a requested read ahead operation with an amount of read cache between a requested amount and an available amount if the read cache available is less than an amount that an individual one of the read ahead streams is requesting.

13. A computer-readable storage medium encoding a computer program for executing a computer process on a computer system, the computer process comprising:
converting each of a plurality of groups of sequential host read requests into a respective group of read commands, the read commands in each group of read commands being in a sequentially ascending order of logical block addresses (LBAs);
determining, for each group of read commands, a burst length by summing read command lengths of each of the read commands in the group;
determining, for each group of read commands, a read ahead data size by applying a multiplier to the burst length of the group;
initiating, for each group of read commands, a read ahead stream at the read ahead data size for the group;
monitoring total read ahead allocation of the read ahead streams, including:
determining an amount of read ahead data that each read ahead stream is processing in the read ahead operations;
determining a total amount of read cache available for the storage controller; and
determining a total amount of read ahead data that the read ahead streams are processing in the read ahead operations; and
storing each read ahead stream processing read ahead operations and the amount of read ahead data that said each read ahead stream is processing in the read ahead operations in a hash table.

14. The computer-readable storage medium of claim 13, further comprising:
determining whether to perform a requested read ahead for a read ahead stream based on the total amount of read cache available and results from monitoring the total read ahead allocation;
performing a requested read ahead operation for a first read ahead stream responsive to determining the total amount of read cache available and results from monitoring the total read ahead allocation; and
receiving at least one input from a read ahead stream when the read ahead stream is available to process a read ahead.

15. The computer-readable storage medium of claim 14, wherein the at least one input is a container number of a stream, a stream identifier, and an amount of read ahead data requested.

16. The computer-readable storage medium of claim 14, further comprising:
decrementing a previous value for an individual one of the read ahead streams from the total read ahead allocation if the individual read ahead stream is in the hash table;
removing the individual read ahead stream from the hash table; and
determining whether to perform a requested read ahead for the individual read ahead stream based on the total amount of read cache available and results from monitoring the total read ahead allocation.

17. The computer-readable storage medium of claim 16, further comprising performing a requested read ahead if the read cache available is more than an amount the individual read ahead stream is requesting.

18. The computer-readable storage medium of claim 16, further comprising performing a requested read ahead with an amount of read cache between a requested amount and an available amount if the read cache available is less than an amount the individual read ahead stream is requesting.

* * * * *